US011268581B2

(12) United States Patent
Akamatsu

(10) Patent No.: US 11,268,581 B2
(45) Date of Patent: Mar. 8, 2022

(54) ONE-WAY CLUTCH AND SHEET CONVEYANCE APPARATUS

(71) Applicant: CANON KABUSHIKI KAISHA, Tokyo (JP)

(72) Inventor: Yuki Akamatsu, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 495 days.

(21) Appl. No.: 16/393,098

(22) Filed: Apr. 24, 2019

(65) Prior Publication Data
US 2019/0338812 A1 Nov. 7, 2019

(30) Foreign Application Priority Data

May 2, 2018 (JP) .............................. JP2018-088926

(51) Int. Cl.
B65H 3/06 (2006.01)
F16D 41/00 (2006.01)
F16D 41/06 (2006.01)
B41J 11/00 (2006.01)
B65H 5/06 (2006.01)

(52) U.S. Cl.
CPC ............. *F16D 41/06* (2013.01); *B41J 11/007* (2013.01); *B65H 5/06* (2013.01); *B65H 2403/722* (2013.01); *F16D 2041/0608* (2013.01)

(58) Field of Classification Search
CPC .......... F16D 41/06; F16D 41/00; F16D 41/12; F16D 2041/0608; B65H 2403/722; B41J 11/007; G03G 15/757; G03G 21/1857
See application file for complete search history.

(56) References Cited

U.S. PATENT DOCUMENTS

| 7,214,161 | B2 | 5/2007 | Jinbo ............................. 475/346 |
| 8,597,156 | B2 | 12/2013 | Araki et al. ................... 475/331 |
| 10,920,855 | B2 | 2/2021 | Migaszewski et al. ..................... B62M 11/02 |
| 2003/0178276 | A1 | 9/2003 | Fraczek et al. ............... 192/3.52 |
| 2005/0130794 | A1 | 6/2005 | Jinbo ............................. 475/331 |
| 2013/0068581 | A1 | 3/2013 | Araki et al. ............. 192/45.002 |
| 2015/0003871 | A1 | 1/2015 | Takahashi |

(Continued)

FOREIGN PATENT DOCUMENTS

| CN | 102884335 | 1/2013 |
| CN | 205936943 U | 2/2017 |

(Continued)

OTHER PUBLICATIONS

European Search Report issued in corresponding European Application No. 19170759.5 dated Oct. 2, 2019.

(Continued)

*Primary Examiner* — Luis A Gonzalez
(74) *Attorney, Agent, or Firm* — Venable LLP

(57) ABSTRACT

A one-way clutch includes a first rotator including an inner gear and configured to rotate on a first axis, a planetary gear configured to mesh with the inner gear and configured to rotate on a second axis that revolves around the first axis, a second rotator configured to rotate on the first axis and including a stopper configured to stop rotation of the planetary gear by engaging with the planetary gear, and an urging member configured to urge the planetary gear not to be brought in contact with the stopper in a state where the first rotator and the second rotator relatively rotate.

12 Claims, 7 Drawing Sheets

(56) References Cited

U.S. PATENT DOCUMENTS

2018/0017138 A1\* 1/2018 Uesugi ............... G03G 15/6529
2018/0328451 A1 11/2018 Migaszewski et al. . B62M 1/36
2019/0300309 A1\* 10/2019 Takahashi ................ B65H 5/06

FOREIGN PATENT DOCUMENTS

| CN | 107110246 | | 8/2017 |
| CN | 1629512 | | 4/2019 |
| DE | 10 2011 010 080 A1 | | 2/2012 |
| JP | 2004-019757 A | | 1/2004 |
| JP | 2015094398 A | \* | 5/2015 |
| JP | 2017-198295 A | | 11/2017 |

OTHER PUBLICATIONS

Office Action dated Jan. 28, 2021 in counterpart Chinese Application No. 201910341359.8, together with English translation thereof.

\* cited by examiner

ONE-WAY CLUTCH AND SHEET CONVEYANCE APPARATUS

BACKGROUND OF THE INVENTION

Field of the Invention

The present invention relates to a one-way clutch adopting an inscribed gear system and a sheet conveyance apparatus for conveying sheets.

Description of the Related Art

Heretofore, a one-way clutch adopting an inscribed gear system described in Japanese Patent Application Laid-Open Publication No. 2017-198295 is known. The one-way clutch includes a cylindrically shaped outer member having an inner gear formed on an inner periphery thereof, a planetary gear meshed with the inner gear, and an inner member housed in an inner side of the outer member. The inner member is provided with a stopper edge portion that meshes with gear teeth of the planetary gear, and relative rotation of the inner member and the outer member is restricted by the planetary gear meshing with the stopper edge portion. In a state where the outer member attempts to rotate in a specific direction with respect to the inner member as reference, relative rotation of the inner member and the outer member is permitted by the planetary gear disengaging from the stopper edge portion.

However, according to the configuration disclosed in Japanese Patent Application Laid-Open Publication No. 2017-198295, in a state where the inner member and the outer member are rotated relatively, the gear teeth of the planetary gear may collide against the stopper edge portion of the inner member and generate collision noise.

SUMMARY OF THE INVENTION

According to one aspect of the invention, a one-way clutch includes: a first rotator including an inner gear and configured to rotate on a first axis; a planetary gear configured to mesh with the inner gear and configured to rotate on a second axis that revolves around the first axis; a second rotator configured to rotate on the first axis and including a stopper configured to stop rotation of the planetary gear by engaging with the planetary gear, wherein relative rotation of the first rotator and the second rotator is restricted in a state where the planetary gear and the stopper are engaged, and is permitted in a state where the planetary gear and the stopper are disengaged; and an urging member configured to urge the planetary gear not to be brought in contact with the stopper in a state where the first rotator and the second rotator relatively rotate.

According to another aspect of the invention, a sheet conveyance apparatus includes a driving source; a conveyance member configured to be driven by the driving source and convey a sheet; and a one-way clutch configured to transmit driving force from the driving source to the conveyance member. The one-way clutch includes: a first rotator including an inner gear and configured to rotate on a first axis; a planetary gear configured to mesh with the inner gear and configured to rotate on a second axis that revolves around the first axis; a second rotator configured to rotate on the first axis and including a stopper configured to stop rotation of the planetary gear by engaging with the planetary gear, wherein one of the first and second rotators is coupled to the driving source and the other of the first and second rotators is coupled to the conveyance member, and wherein relative rotation of the first rotator and the second rotator is restricted in a state where the planetary gear and the stopper are engaged, and is permitted in a state where the planetary gear and the stopper are disengaged; and an urging member configured to urge the planetary gear not to be brought in contact with the stopper in a state where the first rotator and the second rotator relatively rotate.

Further features of the present invention will become apparent from the following description of exemplary embodiments with reference to the attached drawings.

DESCRIPTION OF THE EMBODIMENTS

Figure 1:
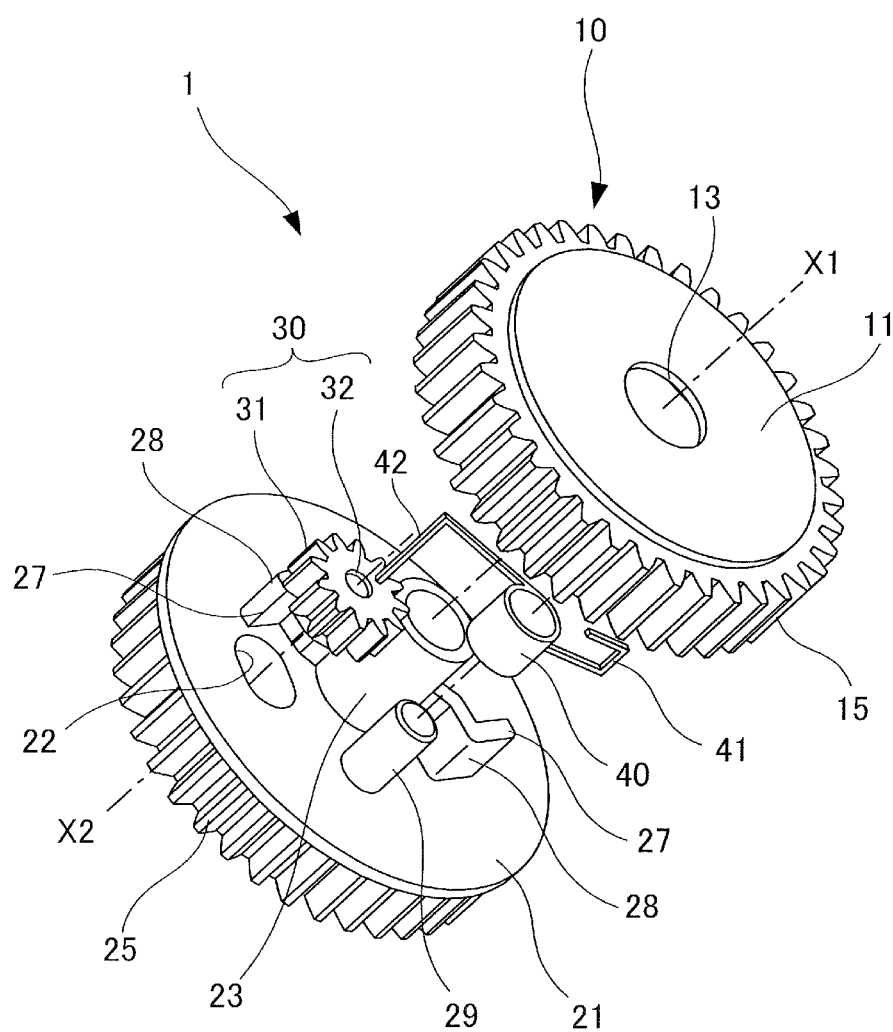
FIG. 1 is an exploded view of a one-way clutch according to a first embodiment.

Exemplary embodiments of the present invention will be described with reference to the drawings.

First, a basic configuration of a one-way clutch adopting an inscribed gear system will be described. A one-way clutch 100 illustrated in FIG. 5 includes an outer member 110 including an inner gear 114, an inner member 120 capable of relatively rotating with respect to the outer member 110, and a planetary gear 130 meshed with the inner gear 114. The inner member 120 is arranged on an inner side of the outer member 110 having a cylindrical shape, and the planetary gear 130 is stored in a recessed portion 126 provided on the inner member 120. Further, the inner member 120 includes a stopper edge 127 engageable with the teeth of the planetary gear 130.

As described below, the one-way clutch 100 connects the outer member 110 and the inner member 120, which are coaxial rotary members, in a state permitting relative rotation in a specific direction. Hereafter, a direction of rotation of the outer member 110 with respect to the inner member 120 is referred to as a "first direction R1" or a "second direction R2".

The "direction of rotation of the outer member 110 with respect to the inner member 120" refers to a direction of relative rotation of the inner member 120 and the outer member 110 in a case where the inner member 120 is deemed as reference. Accordingly, rotation of the outer member 110 with respect to the inner member 120 includes a case where the inner member 120 is rotating and the outer member 110 is stopped and a case where both members are rotating at different angular velocities. The first direction R1 refers to a clockwise direction in FIG. 5, and the second direction R2 refers to an opposite direction of rotation as the first direction R1, that is, a counterclockwise direction in FIG. 5.

In a state where the outer member 110 attempts to rotate in the first direction R1 with respect to the inner member 120, the one-way clutch 100 is connected. That is, the planetary gear 130 engages with the stopper edge 127 along with the inner gear 114 rotating in the first direction R1 (broken line position), and rotation of the planetary gear 130 stops. In a state where rotation of the planetary gear 130 is restricted, relative position of the stopper edge 127 and the teeth of the inner gear 114 meshed with the planetary gear 130 is fixed. That is, the outer member 110 is restricted from relatively rotating in the first direction R1 with respect to the inner member 120.

In a state where the outer member 110 rotates in the second direction R2 with respect to the inner member 120, connection of the one-way clutch 100 is released. That is, the planetary gear 130 rotates along with the inner gear 114 rotating in the second direction R2 at a position separated from the stopper edge 127 (solid line position). Thereby, the inner gear 114 is enabled to rotate with respect to the stopper edge 127, and the outer member 110 is permitted to rotate relatively in the second direction R2 with respect to the inner member 120.

Figure 5:
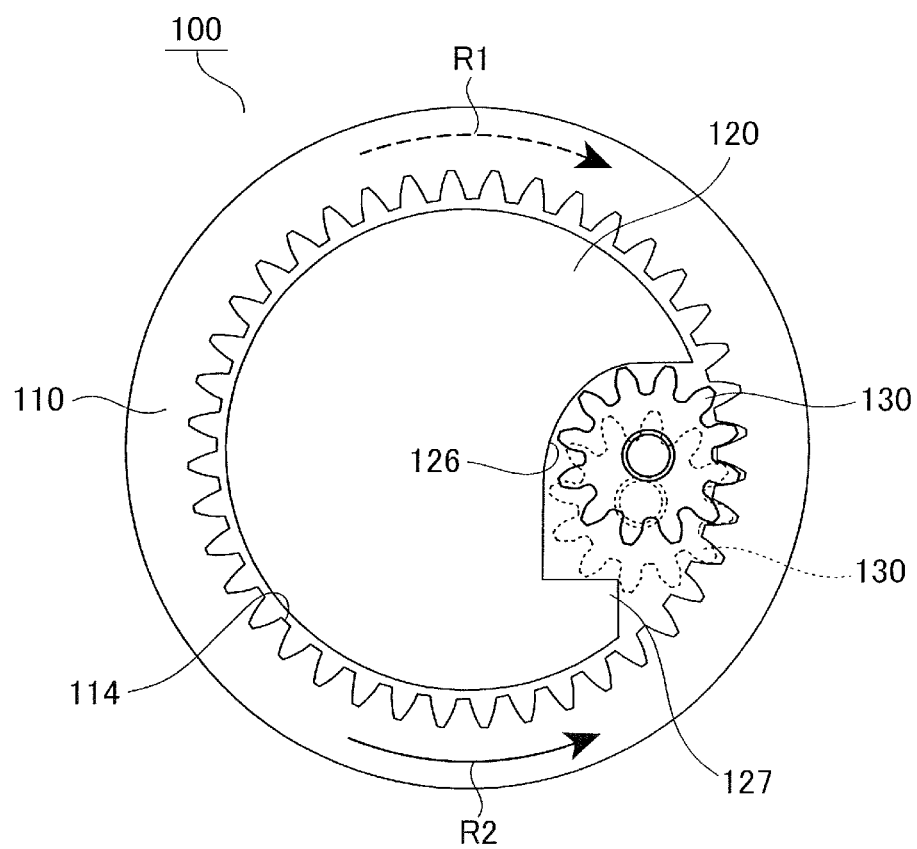
FIG. 5 is a schematic drawing illustrating a configuration example of a one-way clutch adopting an inscribed gear system.

By the way, in the configuration illustrated in FIG. 5, in a state the outer member 110 rotates in the second direction R2 with respect to the inner member 120, there were cases where the planetary gear 130 collided against the stopper edge 127 and collision noise was generated. For example, if the outer member 110 rotates in the second direction R2 in a state where the stopper edge 127 is at the position of FIG. 5, the planetary gear 130 is expected to rotate at the solid line position away from the stopper edge 127. However, there were cases where the planetary gear 130 actually fell to the broken line position and interfered with the stopper edge 127, and the teeth of the planetary gear 130 repeatedly collided against the stopper edge 127 along with the rotation of the inner gear 114.

As explained in detail below, the present embodiments each include an urging member that urges the planetary gear to reduce such generation of collision noise. The following illustrates a configuration example of a one-way clutch having an urging member.

First Embodiment

Figure 2A:
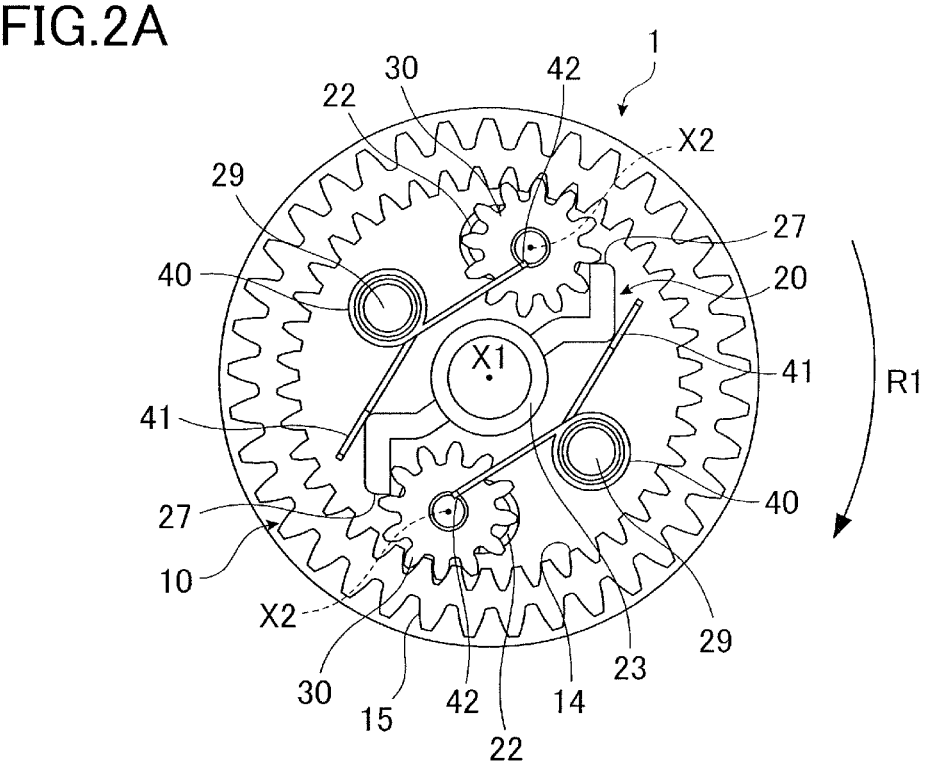
FIG. 2A is a schematic view illustrating the one-way clutch according to the first embodiment in a connected state.
Figure 2B:
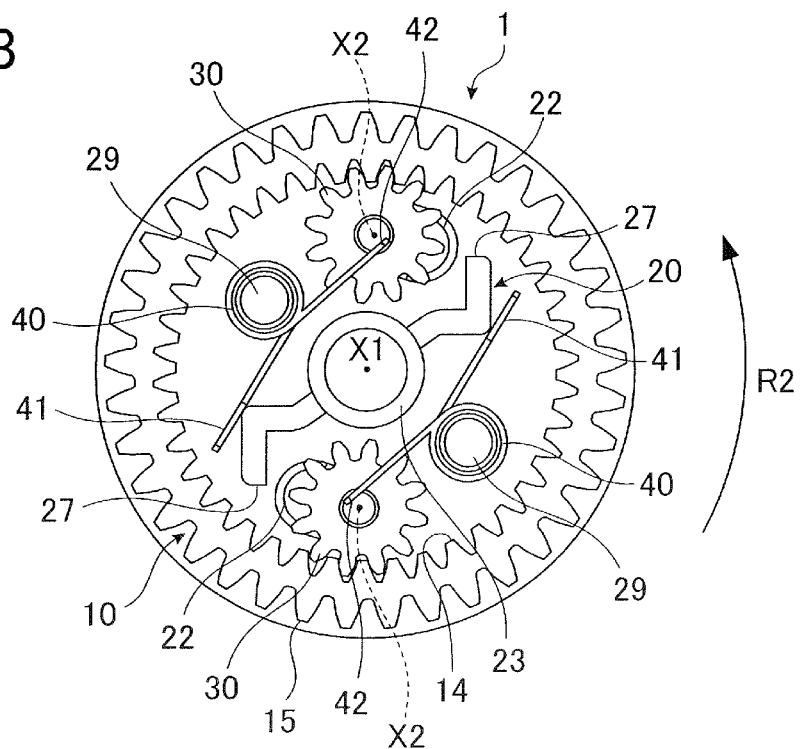
FIG. 2B is a schematic view illustrating the one-way clutch according to the first embodiment in a released state.
Figure 3A:
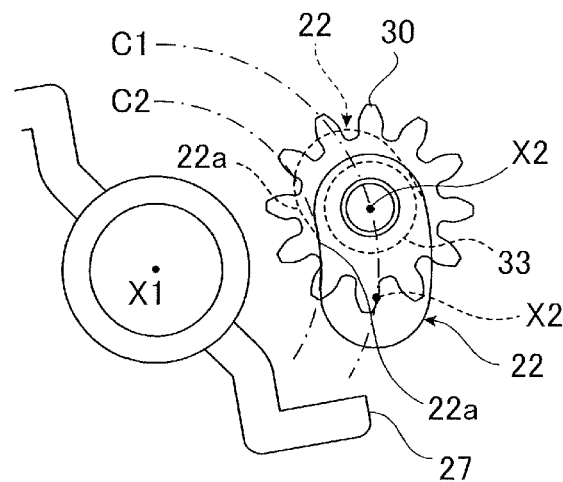
FIG. 3A is a schematic diagram illustrating a movable range of a planetary gear according to the first embodiment.
Figure 3B:
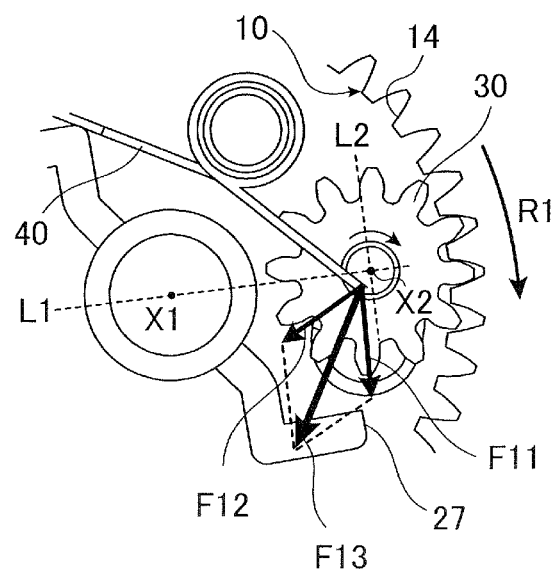
FIG. 3B is a schematic diagram illustrating a relationship of forces acting on the planetary gear of to the first embodiment.
Figure 3C:
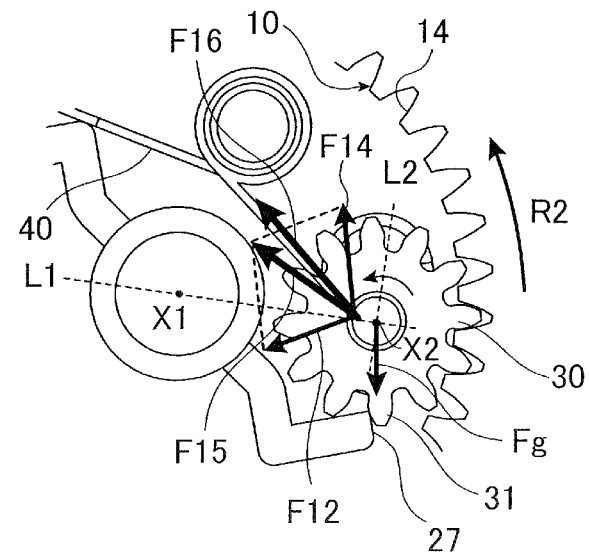
FIG. 3C is a schematic diagram illustrating a relationship of forces acting on the planetary gear of the first embodiment.

At first, a one-way clutch according to a first embodiment will be described with reference to FIGS. 1 through 3. FIG. 1 is an exploded view of a one-way clutch 1. FIGS. 2A and 2B are schematic drawings respectively illustrating states inside the clutch in a connected state and in a released state. FIG. 3A is a schematic diagram illustrating a movable range of a planetary gear 30, and FIGS. 3B and 3C are schematic diagrams illustrating forces that act on the planetary gear 30 when the gear 30 transits from the connected state to the released state and vice versa.

As illustrated in FIG. 1, the one-way clutch 1 includes an outer member 10, an inner member 20, the planetary gear 30 and an urging spring 40. The outer member 10 serves as a first rotator according to the present embodiment, and the inner member 20 serves as a second rotator according to the present embodiment. The urging spring 40 serves as an urging member according to the present embodiment. There are two planetary gears 30 and two urging springs 40 in the present embodiment, but the planetary gear 30 and the urging spring 40 on the back side of the drawing is not illustrated in FIG. 1.

The outer member 10 and the inner member 20 are arranged coaxially, that is, arranged on a common axis X1. The axis X1 is a first axis of the present embodiment. Hereafter, unless stated otherwise, the direction of axis X1 is referred to as "axial direction". Further, when viewed in the axial direction, a direction along a straight line that passes axis X1 is referred to as "radial direction", and a direction along a circular arc around the axis X1 is referred to a "circumferential direction".

The outer member 10 and the inner member 20 are provided with external gears 15 and 25 respectively meshed with other gears. Normally, one of the external gears 15 and 25 is meshed with a driving gear driven by a driving source such as a motor, and the other of the external gears 15 and 25 is meshed with a driven gear connected to an object to be driven. Whether to arrange the outer member 10 or the inner member 20 upstream, that is, on a driving source side, in a drive transmission path can be determined arbitrarily.

The outer member 10 and the inner member 20 constitute a clutch case that houses the main components of the one-way clutch 1. That is, the outer member 10 has a cylindrical shape with a bottom, including a disk-shaped side wall 11 arranged at a first end portion in the axial direction. The inner member 20 includes a disk-shaped side wall 21 that covers an inner space of the outer member 10 after assembly. The inner member 20 includes a boss 23 that extends in the axial direction from the side wall 21, and a fitting hole 13 to which the boss 23 fits is formed on the side wall 11 of the outer member 10. The outer member 10 and the inner member 20 are engaged in a manner enabling relative rotation around the axis X1 by fitting of the boss 23 to the fitting hole 13.

A hole that passes through the inner periphery of the boss 23 in the axial direction is provided. The one-way clutch 1 is assembled to the drive transmission apparatus by inserting a shaft member fixed to the apparatus body of the drive transmission apparatus to a hole of the boss 23.

The planetary gear 30 has teeth 31 that are meshed with an inner gear 14 (refer to FIGS. 2A and 2B) of the outer member 10, and it is housed between side walls 11 and 21 of the outer member 10 and the inner member 20. The planetary gear 30 has a boss portion 33 (refer to FIG. 3A) arranged to project in the axial direction, and the boss portion 33 is fit to a long hole 22 formed on the side wall 21 of the inner member 20. The long hole 22 extends in the circumferential direction around axis X1 and retains the planetary gear 30 in a state rotatable around a rotation-axis X2 that is parallel to axis X1 and also capable of revolving around axis X1. The rotation-axis X2 is a second axis of the present embodiment. The long hole 22 serves as an opening portion of the present embodiment. The opening portion is not limited to a through hole, and it can be a groove having sufficient depth to allow the boss portion 33 to fit thereto.

A stopper edge 27 that is engageable with the planetary gear 30 is provided on the inner member 20, as illustrated in FIG. 1. The inner member 20 has a projected portion 28 that protrudes from the side wall 21 in the axial direction and also protrudes from the boss 23 in the radial direction, and the stopper edge 27 is provided at an end portion on an outer side in the radial direction of the projected portion 28. The planetary gear 30 is capable of moving with respect to the inner member 20 between a position engaged with the stopper edge 27, i.e., engaged position, and a position disengaged from the stopper edge 27, i.e., disengaged position. The stopper edge 27 serves as a stopper according to the present embodiment. The shape of the stopper is not limited to the illustrated shape of the stopper edge 27, as long as it stops rotation of the planetary gear 30 when engaged with the planetary gear 30.

The urging spring 40 according to the present embodiment is a torsion coil spring. The urging spring 40 has its coil portion supported by a supporting shaft 29 that protrudes in the axial direction from the side wall 21 of the inner member 20. A first end portion 41 of the urging spring 40 is engaged with the inner member 20, and a second end portion 42 is engaged with a recessed portion 32 provided on an inner portion of the planetary gear 30. The operations of the urging spring 40 will be described later.

As illustrated in FIG. 2, in the present embodiment, there are two planetary gears 30 and 30, and further, two projected portions 28, 28 and two urging springs 40, 40 are also provided at mutually opposing positions interposing the axis X1. Respective urging springs 40 are arranged in the space between two projected portions 28 and 28 so as to effectively utilize the storage space formed by the outer member 10 and the inner member 20. That is, an end portion 41 of the urging spring 40 is engaged with the projection portion 28 that is different from the projected portion 28 provided with the stopper edge engaged with the planetary gear 30 serving to be urged. The planetary gear 30, the stopper edge 27 and the urging spring 40 are arranged so that their positions in the axial direction are overlapped with each other. According to this arrangement, the one-way clutch 1 can be formed in a compact manner. Overlap of positions of two members in the predetermined direction refers to a state where, if the respective members are projected in a virtual straight line extending in the predetermined direction, at least a portion of a projection range of one member overlaps with a projection range of the other member.

In a case where one of the planetary gears 30 is referred to as the first planetary gear, the other planetary gear 30 corresponds to a second planetary gear of the present embodiment. Further, one of the urging springs 40 and 40 urging the first planetary gear corresponds to a first urging member of the present embodiment, and the other urging spring 40 corresponds to a second urging member of the present embodiment. Similarly, one of the stopper edges 27 and 27 engaged with the first planetary gear corresponds to a first stopper according to the present embodiment, and the other stopper edge 27 corresponds to a second stopper according to the present embodiment.

The operation of the one-way clutch 1 is described with reference to FIG. 2. FIG. 2A illustrates a connected state in which the outer member 10 and the inner member 20 are connected. In this state, the planetary gear 30 is engaged with the stopper edge 27 and rotation thereof is stopped, and the outer member 10 is connected to the inner member 20 via the planetary gear 30. That is, the one-way clutch 1 is configured to regulate relative rotation of the outer member 10 in a first direction R1 with respect to the inner member 20.

FIG. 2B illustrates a released state where connection of the outer member 10 and the inner member 20 is released. In this state, the planetary gear 30 is disengaged from the stopper edge 27. In a state where the outer member 10 rotates in the second direction R2 with respect to the inner member 20, along with the rotation of the inner gear 14, the planetary gear 30 rotates in a state separated from the stopper edge 27, and the outer member 10 rotates idly with respect to the inner member 20. That is, the one-way clutch 1 is configured to permit relative rotation where the outer member 10 rotates in the second direction R2 with respect to the inner member 20.

Next, an operation of a case where the clutch transits between the connected state and the released state and an operation of the urging spring 40 are described.

As illustrated in FIG. 3A, the planetary gear 30 is retained in the inner member 20 in a state where the boss portion 33 is fit to the long hole 22. The rotation-axis X2 of the planetary gear 30 is movable along a trajectory of revolution C1 around axis X1 with respect to the inner member 20. Within the movable range of the planetary gear 30, the end portion close to the stopper edge 27 in the circumferential direction with respect to axis X1 is the engaged position, and the end portion far from the stopper edge 27 is the disengaged position.

As illustrated in FIG. 3B, in a state where the outer member 10 attempts to rotate in the first direction R1 with respect to the inner member 20 in a state where the planetary gear 30 is in the disengaged position, the one-way clutch 1 transits from the released state to the connected state. In this state, the planetary gear 30 receives force F11 received from a meshing surface with the inner gear 14 and urging force F12 of the urging spring 40. If resultant force F13 of these forces F11 and F12 acts to bring the planetary gear 30 close to the stopper edge 27, the planetary gear 30 engages with the stopper edge 27. That is, the closer the direction of force acting on the planetary gear 30 is to the direction of movement of the planetary gear 30 moving from the disengaged position to the engaged position, the easier the one-way clutch 1 is connected.

Now, the urging force F12 that the urging spring 40 according to the present embodiment applies to the planetary gear 30 contains a component in a centripetal direction (centripetal component) with respect to axis X1 when viewed in the axial direction, and a component in a direction in which the planetary gear 30 approaches the stopper edge 27 in the circumferential direction. The centripetal direction with respect to axis X1 refers to a direction along a straight line L1 passing through the axis X1 and the rotation-axis X2 of the planetary gear 30 and refers to a direction toward the axis X1 from the rotation-axis X2. The direction in which the planetary gear 30 approaches the stopper edge 27 refers to a tangential direction along a tangent line L2, i.e., straight line perpendicular to the straight line L1, of the trajectory of revolution C1 at a position of the rotation-axis X2 and is directed toward the stopper edge 27.

Since the urging force F12 of the urging spring 40 contains a component in a direction in which the planetary gear 30 approaches the stopper edge 27, the planetary gear 30 promptly approaches the stopper edge 27 and engages with the stopper edge 27. That is, by using the urging spring 40 according to the present embodiment, it becomes possible to improve a response speed of a case where the one-way clutch 1 in the released state is connected.

As illustrated in FIG. 3C, if the outer member 10 attempts to rotate in the second direction R2 with respect to the inner member 20 in a state where the planetary gear 30 is in the engaged position, the one-way clutch 1 transits from the connected state to the released state. In this state, a force F16 received by the planetary gear 30 contains a force F14 received from a meshing surface with the inner gear 14 and a resultant force F15 with the urging force F12 of the urging spring 40. The closer the direction of force acting on the planetary gear 30 is to the direction of movement of the planetary gear 30 moving from the engaged position to the disengaged position, the easier the one-way clutch 1 is released.

In a positional relationship where the stopper edge 27 is positioned lower than the planetary gear 30, a gravity Fg acting on the planetary gear 30 functions as a force to move the planetary gear 30 toward the stopper edge 27. Therefore, in a state where a component upward in the vertical direction of the force F16 acting on the planetary gear 30 is referred to as Fa, the following should be satisfied:

Fa>Fg (where signs of Fa and Fg are always positive).

In a state where this relationship is satisfied, even in a positional relationship illustrated in FIG. 3C where gravity Fg acts disadvantageously with respect to the releasing of connection, the planetary gear 30 moves to the disengaged position and is retained in the disengaged position.

The urging force F12 of the urging spring 40 according to the present embodiment contains a component in the direction in which the planetary gear 30 approaches the stopper edge 27, but a percentage thereof is suppressed smaller than a component of the urging force F12 in the centripetal direction. Thus, the resultant force F15 contains a large amount of component in the upper direction with respect to the vertical direction, and it enables to move the planetary gear 30 to the disengaged position against the gravity Fg.

Force acting on the planetary gear 30 contains sliding friction of the boss portion 33 of the planetary gear 30 against the wall surface of the long hole 22. In a state where the outer member 10 rotates in the second direction R2 with respect to the inner member 20, the planetary gear 30 rotates along this direction, that is, counterclockwise direction in FIG. 3C. In this state, since the planetary gear 30 is urged toward the axis X1 by the urging spring 40, the boss portion 33 rotates in contact with a wall surface 22a (refer to FIG. 3A), on an inner side in the radial direction with respect to the axis X1, of the long hole 22. The magnitude of perpendicular resistance that the boss portion 33 receives from the wall surface 22a of the long hole 22 corresponds to the component in the centripetal direction of the urging force F12 of the urging spring 40.

In a positional relationship as illustrated in FIGS. 3A and 3C where the stopper edge 27 is positioned lower than the planetary gear 30, the boss portion 33 rotates while rubbing the wall surface 22a in the downward direction. As a result, the planetary gear 30 receives upward frictional force from the wall surface 22a. That is, a component in the centripetal direction of the urging force F12 of the urging spring 40 acts on the planetary gear 30 as upward force toward a direction to avoid contact with the stopper edge 27 through a friction phenomenon between the boss portion 33 and the wall surface 22a of the long hole 22. Then, the force F16 acting on the planetary gear 30 contains greater amount of upward component in the vertical direction than the resultant force F15, and the planetary gear 30 can be moved easily to the disengaged position. This force continuously acts on the planetary gear 30 even after it has moved to the disengaged position, so that the planetary gear 30 can be retained at the disengaged position against gravity Fg.

As described, according to the present embodiment adopting the urging spring 40 that urges the planetary gear 30 toward the axis X1, the planetary gear 30 can be prevented from colliding against the stopper edge 27 in the case where the outer member 10 and the inner member 20 relatively rotate. Thereby, generation of collision noise can be reduced. Further, since collision of the planetary gear 30 and the stopper edge 27 is avoided, damaging of the teeth 31 of the planetary gear 30 or the stopper edge 27 can be reduced.

Another possible method for avoiding collision of the planetary gear 30 and the stopper edge 27 in a state where the outer member 10 and the inner member 20 rotate relatively is to apply grease to the planetary gear 30. By applying grease, adhesiveness of the planetary gear 30 and the inner gear 14 or the inner member 20 is increased, such that the possibility of the planetary gear 30 moving by gravity or the like from the disengaged position to the engaged position can be reduced. According to this method, however, there is a need to control the amount of application of grease precisely, which leads to increase of number of manufacturing steps and costs, and in a case where the grease is vaporized or degraded, the operation of the one-way clutch 1 may become unstable. Further, by applying grease, the rotational resistance of the planetary gear 30 is increased, such that power loss in a state where the one-way clutch 1 slips may be increased.

Meanwhile, according to the present embodiment, it is not necessary to use grease in order to avoid the planetary gear 30 from colliding with the stopper edge 27, so that the above-described drawback can be prevented or reduced. It should be noted that grease can be used in addition to the configuration of the present embodiment.

Modified Example

In the above-described embodiment, it has been described that the long hole 22 extends along the circumferential direction with respect to the axis X1, that is, direction of revolution of the planetary gear 30, but the shape of the long hole 22 can also be changed as follows. As illustrated by the broken line in FIG. 3A, the portion of the long hole 22 on the side far from the stopper edge 27 can be designed to curve toward the centripetal direction compared to the trajectory of revolution C1 of the planetary gear 30. In that case, the wall surface 22a on the inner side of the long hole 22 in the radial direction is designed to approach the axis X1 than a circular arc C2 around the axis X1 as it becomes distant from the stopper edge 27. A portion of the long hole 22 extending along the trajectory of revolution C1 at a side close to the stopper edge 27 with respect to the circumferential direction serves as the first portion according to the present modified example, and a portion of the long hole 22 curving inward from the trajectory of revolution C1 at a side distant from the stopper edge 27 serves as a second portion according to the present modified example Such configuration enables the upward component of friction force that the boss portion 33 of the planetary gear 30 receives from the wall surface 22a while the planetary gear 30 rotates causing friction with the wall surface 22a to be increased compared to the above-described embodiment. Therefore, compared to the above-described embodiment, the movement of the planetary gear 30 from the disengaged position to the engaged position can be restricted even stronger when the outer member 10 and the inner member 20 rotate relatively.

Further, a torsion coil spring is used as the urging member according to the above-described embodiment, but other types of elastic members can be used. For example, by connecting the boss 23 of the inner member 20 and the planetary gear 30 by a coil spring that is arranged at a position along the radial direction, that is, at a position along the straight line L1 connecting X1 and X2, the planetary gear 30 can be urged in the centripetal direction. Further, other than elastic members, the planetary gear 30 can also be urged toward the axis X1 by magnetic force using a permanent magnet, for example.

According to the above-described embodiment, the urging force F12 of the urging spring 40 contains a component in a direction in which the planetary gear 30 approaches the stopper edge 27, but it is also possible to contain a component in a direction in which the planetary gear 30 is moved away from the stopper edge 27. In that case, the urging force F12 of the urging spring 40 acts directly to prevent contact of the planetary gear 30 and the stopper edge 27, so that the occurrence of collision noise can be reduced, similar to the present embodiment.

Second Embodiment

Next, a configuration of a one-way clutch according to a second embodiment will be described. According to the present embodiment, an urging direction of the planetary gear by the urging member differs from the first embodiment described earlier. The other elements configured similarly as the first embodiment are denoted with the same reference numbers as the first embodiment and descriptions thereof are omitted.

Figure 4A:
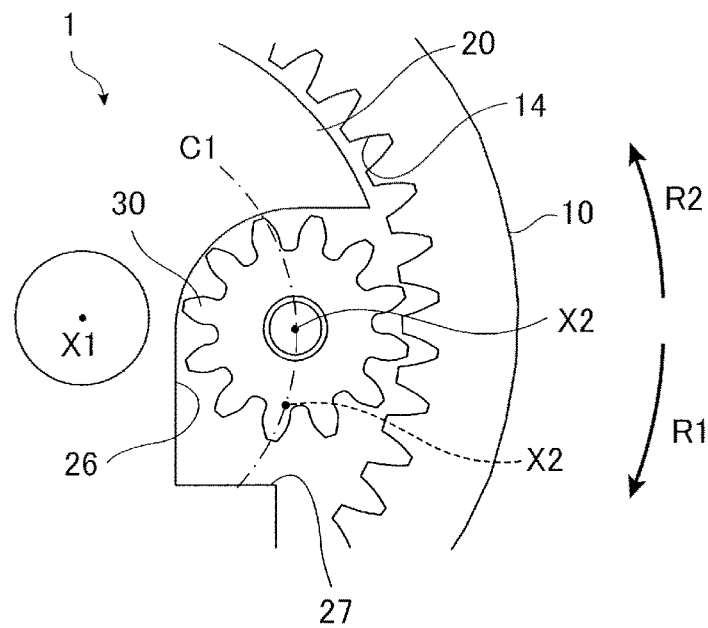
FIG. 4A is a schematic diagram for illustrating a movable range of a planetary gear according to a second embodiment.
Figure 4B:
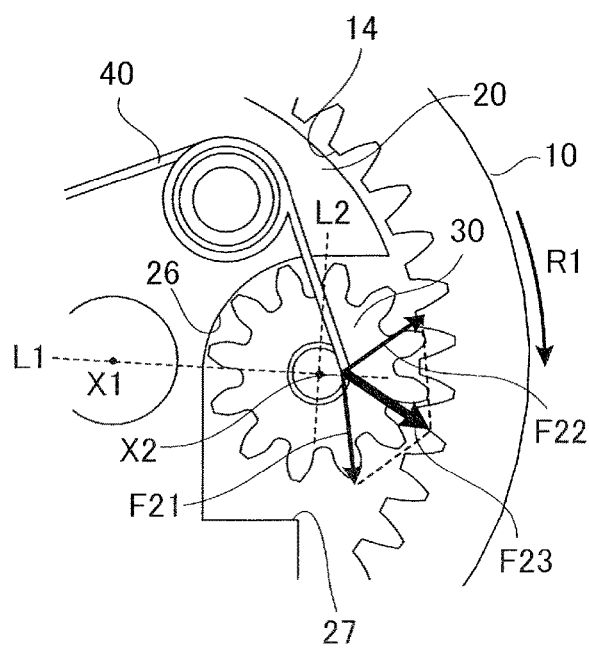
FIG. 4B is a schematic diagram illustrating a relationship of forces acting on the planetary gear of the second embodiment.
Figure 4C:
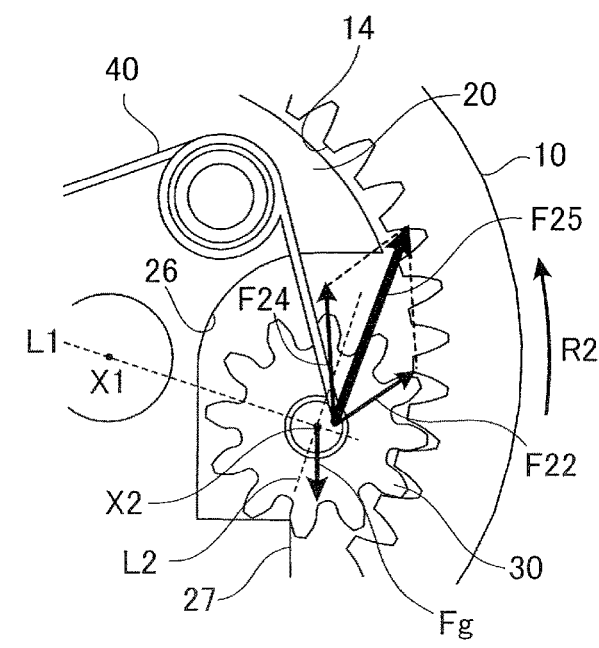
FIG. 4C is a schematic diagram illustrating a relationship of forces acting on the planetary gear of the second embodiment.

FIG. 4A is a schematic diagram illustrating a movable range of a planetary gear 30 according to the present embodiment, and FIGS. 4B and 4C are schematic diagrams illustrating forces acting on the planetary gear 30 when the clutch transits from a connected state to a released state and vice versa.

As illustrated in FIG. 4A, the planetary gear 30 according to the present embodiment is stored in a recessed portion 26 formed on the inner member 20. The recessed portion 26 has a recessed shape toward axis X1 from a cylindrical outer peripheral surface of the inner member 20 when viewed in the axial direction. The stopper edge 27 is arranged at a first end portion of the recessed portion 26 in the circumferential direction with respect to axis X1. Within the recessed portion 26, the planetary gear 30 is movable with respect to the inner member 20 between a disengaged position (FIGS. 4A and 4B) where it is disengaged from the stopper edge 27 along a trajectory of revolution C1 around axis X1 and an engaged position (FIG. 4C) where it is engaged with the stopper edge 27. That is, according to the present embodiment, the movable range of the planetary gear 30 is defined by the width in the circumferential direction of the recessed portion 26.

Similar to the first embodiment, in a state where the planetary gear 30 is at the engaged position, the one-way clutch 1 is in a connected state. In that case, relative rotation where the outer member 10 rotates in a first direction R1 with respect to the inner member 20 is restricted. If the planetary gear 30 is at the disengaged position, the one-way clutch 1 is in a released state. In that case, relative rotation of the outer member 10 with respect to the inner member 20 in a second direction R2 is permitted.

An urging force F22 that the urging spring 40 according to the present embodiment applies to the planetary gear 30 contains a component in a centrifugal direction (centrifugal component) with respect to the axis X1 when viewed in the axial direction, and a component in a direction in which the planetary gear 30 is moved away from the stopper edge 27 in the circumferential direction. The centrifugal direction with respect to the axis X1 refers to a direction along a straight line L1 passing through the axis X1 and the rotation-axis X2 of the planetary gear 30 and refers to a direction toward rotation-axis X2 from axis X1. The direction in which the planetary gear 30 is moved away from the stopper edge 27 is a tangential direction along a tangent line L2 of the trajectory of revolution C1 at a position of the rotation-axis X2 and is directed away from the stopper edge 27.

As illustrated in FIG. 4B, if the outer member 10 attempts to rotate in the first direction R1 with respect to the inner member 20 in a state where the planetary gear 30 is in the disengaged position, the one-way clutch 1 transits from the released state to the connected state. In this state, the planetary gear 30 receives force F21 received from a meshing surface with the inner gear 14 and an urging force F22 of the urging spring 40. If resultant force F23 of these forces F21 and F22 is in a direction moving the planetary gear 30 toward the stopper edge 27 in the circumferential direction, the planetary gear 30 approaches and engages with the stopper edge 27.

The urging force F22 of the urging spring 40 contains a component in a direction in which the planetary gear 30 is moved away from the stopper edge 27 in the circumferential direction, but the rate thereof is suppressed smaller than a component in a centrifugal direction of the urging force F22. Therefore, the resultant force F25 acts in a direction moving the planetary gear 30 toward the stopper edge 27 in the circumferential direction, and the planetary gear 30 moves from the disengaged position to the engaged position.

As illustrated in FIG. 4C, in a state where the outer member 10 attempts to rotate in a second direction R2 with respect to the inner member 20 in a state where the planetary gear 30 is in the engaged position, the one-way clutch 1 transits from the connected state to the released state. In this state, a force F25 received by the planetary gear 30 contains a force F24 received from the meshing surface with the inner gear 14 and resultant force by the urging force F22 of the urging spring 40.

In this state, the gravity Fg acting on the planetary gear 30 in a positional relationship where the stopper edge 27 is positioned lower than the planetary gear 30 functions as a force to move the planetary gear 30 toward the stopper edge 27. Therefore, if a component upward in the vertical direction of the force F25 acting on the planetary gear 30 is referred to as Fa, the planetary gear 30 moves to the disengaged position and is retained in the disengaged position if the following relationship is satisfied:

Fa>Fg (where signs of Fa and Fg are always positive).

The urging force F22 of the urging spring 40 according to the present embodiment contains a component in the direction in which the planetary gear 30 is moved away from the stopper edge 27. Therefore, in a positional relationship where the stopper edge 27 is positioned lower than the planetary gear 30 as illustrated in FIG. 4C, the urging force F22 functions as a force to move the planetary gear 30 upward. Thus, the upward component in the vertical direction of the resultant force F25 becomes greater compared to the case where the force acting on the planetary gear 30 is only the force F24 caused by meshing with the gear, and the planetary gear 30 can be moved easily to the disengaged position against the gravity Fg. Since such force acts continuously even after the planetary gear 30 has moved to the disengaged position, the planetary gear 30 is retained at the disengaged position against the gravity Fg.

As described, according to the present embodiment adopting the urging spring 40 that urges the planetary gear 30, collision of the planetary gear 30 and the stopper edge 27 can be prevented in a state where the outer member 10 and the inner member 20 rotate relatively. Thereby, generation of collision noise can be reduced.

The urging direction and the size of the urging force F22 urging the planetary gear 30 by the urging spring 40 should preferably be set to enable the weight of the planetary gear 30 to be supported only by the urging force F22. That is, in a state where the axis X1 and the rotation-axis X2 are aligned horizontally, the upward component in the vertical direction of the urging force F22 should preferably be equal to or greater than the gravity Fg acting on the planetary gear 30. Thereby, in a state where the outer member 10 and the inner member 20 rotate relatively, the collision of the planetary gear 30 and the stopper edge 27 can be avoided more reliably.

Modified Example

In the present embodiment, it has been described that the urging force F22 of the urging spring 40 contains both a component in the centrifugal direction and a component in the direction in which the planetary gear 30 is moved away from the stopper edge 27. However, even if the urging force F22 only contains a component in a direction in which the planetary gear 30 is moved away from the stopper edge 27, the collision of the planetary gear 30 and the stopper edge 27 can be avoided in a state where the outer member 10 and the inner member 20 rotate relatively.

Further, if the urging force F22 contains a component in the centrifugal direction, the urging force F22 causes increase of contact pressure between the planetary gear 30 and the inner gear 14. As a result, the force F24 that the planetary gear 30 receives from the inner gear 14 at the meshing surface of the gear is increased, and the component in a direction moving away from the stopper edge 27 contained in the force F24 is also increased. Therefore, even if the urging force F22 of the urging spring 40 contains a component in a direction toward the stopper edge 27 in addition to the component in the centrifugal direction, it may be possible to reduce the collision between the planetary gear 30 and the stopper edge 27 in a state where the outer member 10 and the inner member 20 rotate relatively. That is, the sum of force that the planetary gear 30 receives including the urging force F22 of the urging spring 40 and the force F24 by meshing of the gear should satisfy the relationship described earlier (Fa>Fg) in a state where the outer member 10 and the inner member 20 rotate relatively.

As described in the first and second embodiments, the urging direction in which the urging spring 40 urges the planetary gear 30 may be changed arbitrarily as long as the planetary gear 30 does not contact the stopper edge 27 in a state where the outer member 10 and the inner member 20 rotate relatively. However, it is not appropriate if the urging direction of the urging spring 40 only contains a component in the direction to approximate the planetary gear 30 toward the stopper edge 27, that is, if the urging force F24 is a downward arrow along the tangent line L2 in FIG. 4C. In this case, as described in the first or the second embodiment, an effect to prevent the planetary gear 30 from being in contact with the stopper edge 27 cannot be achieved. As a guideline of the urging direction, it is preferred that the direction is outside a 45-degree range about a direction in which the planetary gear 30 is approximated toward the stopper edge 27 when viewed in the axial direction, that is, outside a range that is 22.5 degrees in both right and left directions with respect to a downward direction along the tangent line L2 in FIGS. 3C and 4C.

Application Example to Image Forming Apparatus

As an example of a drive transmission apparatus including the one-way clutch 1 described in the first and second embodiments, an apparatus for transmitting drive from a motor to a roller member for conveying a sheet inside an image forming apparatus will be described. An image forming apparatus refers to an apparatus in general, such as a printer, a copying machine or a multifunction machine, that conveys a sheet serving as a recording medium and forming an image on the sheet.

Figure 6:
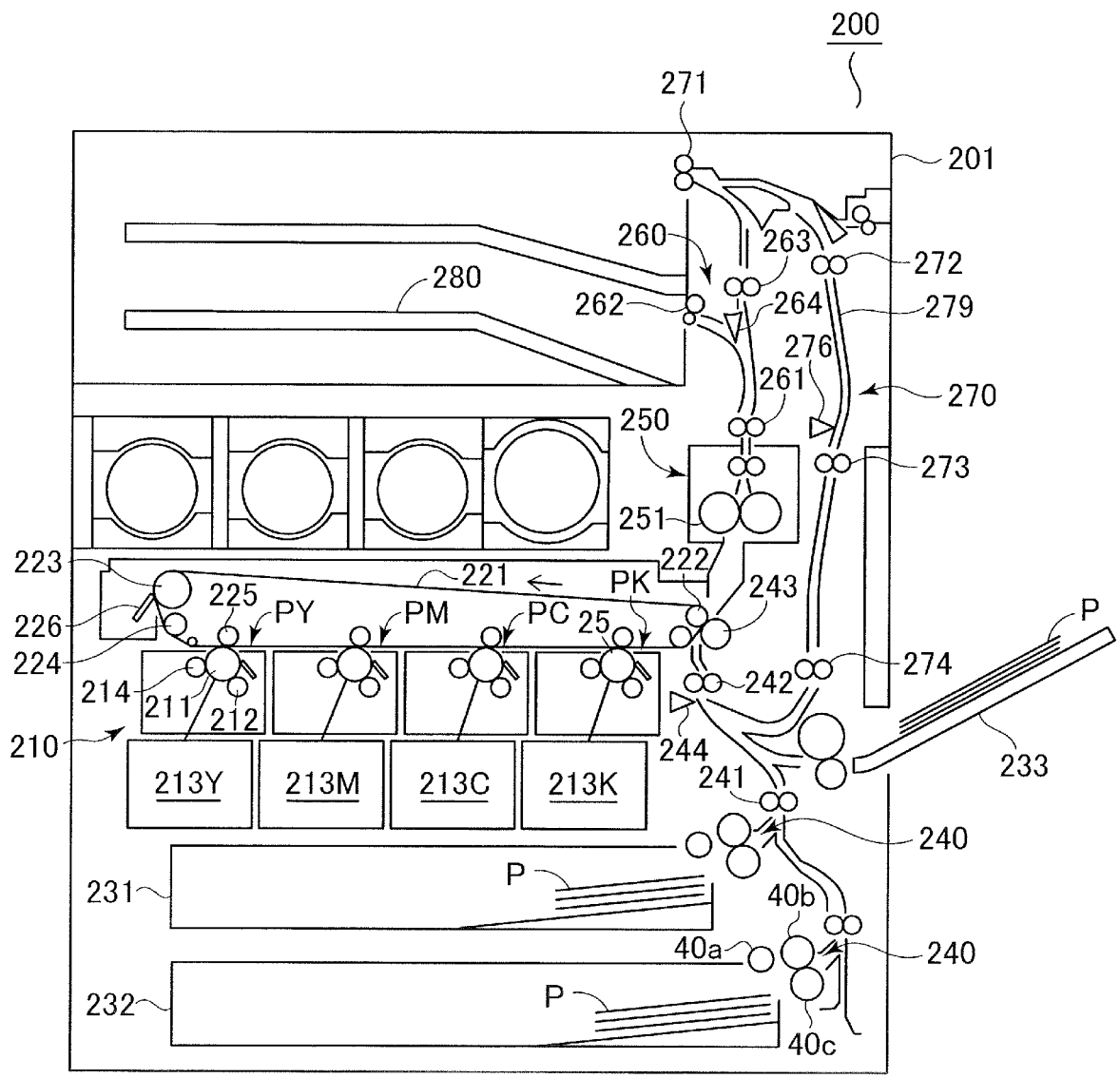
FIG. 6 is a schematic drawing of an image forming apparatus.

An image forming apparatus 200 illustrated in FIG. 6 is a full color laser printer adopting an electrophotographic system in which an image is formed on a sheet P serving as a recording medium. Paper such as normal paper and envelope, coated paper, plastic films such as OHP sheets, cloths and so on can be used as the sheet P. An image forming engine 210 including four image forming units PY, PM, PC and PK for forming toner images of yellow, magenta, cyan and black and an intermediate transfer belt 221 are stored in an apparatus body 201 of the image forming apparatus 200. The image forming units PY through PK each include a photosensitive drum 211 serving as an image bearing member and form a toner image on the photosensitive drum 211. The toner image borne on the photosensitive drum 211 is transferred to the sheet P through the intermediate transfer belt 221 serving as an intermediate transfer body.

The image forming units PY through PK are configured similarly except for the difference in the color of the toner used for developing image, so the configuration of the image forming unit and a forming process of toner image, i.e., image forming operation, will be described taking the yellow image forming unit PY as an example. The image forming unit PY includes, other than the photosensitive drum 211, a charge roller 212 serving as a charging unit, an exposing apparatus 213Y serving as an exposing unit, a developing apparatus 214 serving as a developing unit, and a drum cleaner. The photosensitive drum 211 is a drum-shaped photosensitive member having a photosensitive layer arranged on an outer periphery portion and rotates in a direction along a direction of rotation R1 of the intermediate transfer belt 221. The charge roller 212 charges the surface of the photosensitive drum 211 uniformly, and the exposing apparatus 213Y performs an image writing operation in which a laser beam modulated according to image information is irradiated on the photosensitive drum 211 and electrostatic latent image is written on the surface of the photosensitive drum 211. The developing apparatus 214 stores developer containing toner, and supplies toner to the photosensitive drum 211, by which the electrostatic latent image is developed as a toner image. The toner image formed on the photosensitive drum 211 is primarily transferred by a primary transfer roller 225 serving as a primary transfer apparatus to the intermediate transfer belt 221. Residual toner remaining on the photosensitive drum 211 after transfer is removed by a drum cleaner.

The intermediate transfer belt 221 is wound around a secondary transfer inner roller 222, a stretch roller 223, a tension roller 224 and the primary transfer roller 225 and driven to rotate in a counterclockwise direction in the drawing. The above-described image forming operation is performed simultaneously in the respective image forming units PY through PK, and the toner images of four colors are transferred in a superposed manner where respective images are mutually superposed, by which a full color toner image is formed on the intermediate transfer belt 221. The toner image is borne on the intermediate transfer belt 221 and conveyed to a transfer portion, i.e., secondary transfer portion, formed as a nip portion between a secondary transfer roller 243 and the secondary transfer inner roller 222. In a state where bias voltage having an opposite polarity as a charge polarity of toner is applied to the secondary transfer roller 243 serving as a transfer member, the toner image borne on the intermediate transfer belt 221 is secondarily transferred to the sheet P. Residual toner remaining on the intermediate transfer belt 221 after transfer is removed by a belt cleaner 226.

The sheet P on which toner image has been transferred is transferred to a fixing unit 250. The fixing unit 250 includes a fixing roller pair 251 that nips and conveys the sheet P and a heat source such as a halogen lamp, and applies heat and pressure to a toner image borne on the sheet P. Thereby, toner particles are melted and fixed, and a fixed image fixed on the sheet P is obtained.

Next, a conveyance operation of the sheet P by the image forming apparatus 200 will be described. Sheet feed cassettes 231 and 232 store the sheet P and are attached in a detachable manner to the apparatus body 201. The sheets P stored in the sheet feed cassettes 231 and 232 are fed one by one by a sheet feed unit 240. The sheet feed unit 240 includes a pickup roller 40a sending the sheet P out from the sheet feed cassettes 231 and 232 and a sheet feed roller 40b that receives the sheet P from the pickup roller 40a and conveys the sheet. Further, the sheet feed unit 240 includes a separation roller 40c that separates the sheet P conveyed by the sheet feed roller 40b from other sheets P. The sheet feed unit 240 is one example of a sheet feed unit that feeds the sheet P, and other systems such as a belt system in which the sheet P is adhered to a belt member by a suction fan and conveyed thereon or a sheet feed portion adopting a friction separation system using a pad can be adopted. Further, the user can set the sheet P directly on a manual feed tray 233 provided on a side portion of the apparatus body 201, and the sheet P set on the manual feed tray 233 is fed by the sheet feed unit.

The sheet P sent from the sheet feed unit 240 is conveyed via a pre-registration roller pair 241 to a registration roller pair 242. The registration roller pair 242 serving as an example of a registration portion corrects skewing of the sheet P by abutting against a leading edge of the sheet P, that is, a downstream edge in a conveyance direction of the sheet. Thereafter, the registration roller pair 242 sends the sheet P to a secondary transfer portion at a matched timing with the advancement of image forming operation by the image forming units PY through PK. The sheet P on which toner image has been transferred at the secondary transfer portion and image has been fixed at the fixing unit 250 is transferred to a sheet discharge portion 260, and thereafter, conveyed by a post-fixing roller pair 261 to a switching member 264 capable of switching conveyance paths of the sheet P.

In a state where forming of image on the sheet P is completed, the sheet P having an image formed on a first side, i.e., front side, is discharged by a sheet discharge roller pair 262 onto a sheet discharge tray 280. If an image is to be formed on a second side, i.e., rear side, of the sheet P, the sheet P is transferred by a switching member 264 through a conveyance roller pair 263 to a reverse conveyance portion 270. The reverse conveyance portion 270 includes a reverse conveyance roller pair 271 that performs reverse conveyance, i.e., switch back, of the sheet P, and a reconveyance path 279 that guides the sheet P subjected to switch back by the reverse conveyance roller pair 271 toward the registration roller pair 242. The reverse conveyance roller pair 271 conveys the sheet P for a predetermined distance toward a sheet discharge space above the sheet discharge tray 280, and thereafter conveys the sheet P to the opposite direction to send the sheet P into the reconveyance path 279. As described in detail later, the reconveyance path 279 is provided with a plurality of conveyance roller pairs (272, 273, 274), which convey the sheet P toward the registration roller pair 242 again. Then, the sheet P on which an image has been formed on the second side by passing through the secondary transfer portion and the fixing unit 250 is discharged by the sheet discharge roller pair 262 onto the sheet discharge tray 280.

The above-described image forming engine 210 is an example of an image forming unit, and for example, the image forming unit can also adopt a direct transfer system in which a toner image formed on the photosensitive member is directly transferred to the sheet at the transfer portion. Further, the image forming unit can also adopt an ink-jet printing system or an offset printing system.

Figure 7:
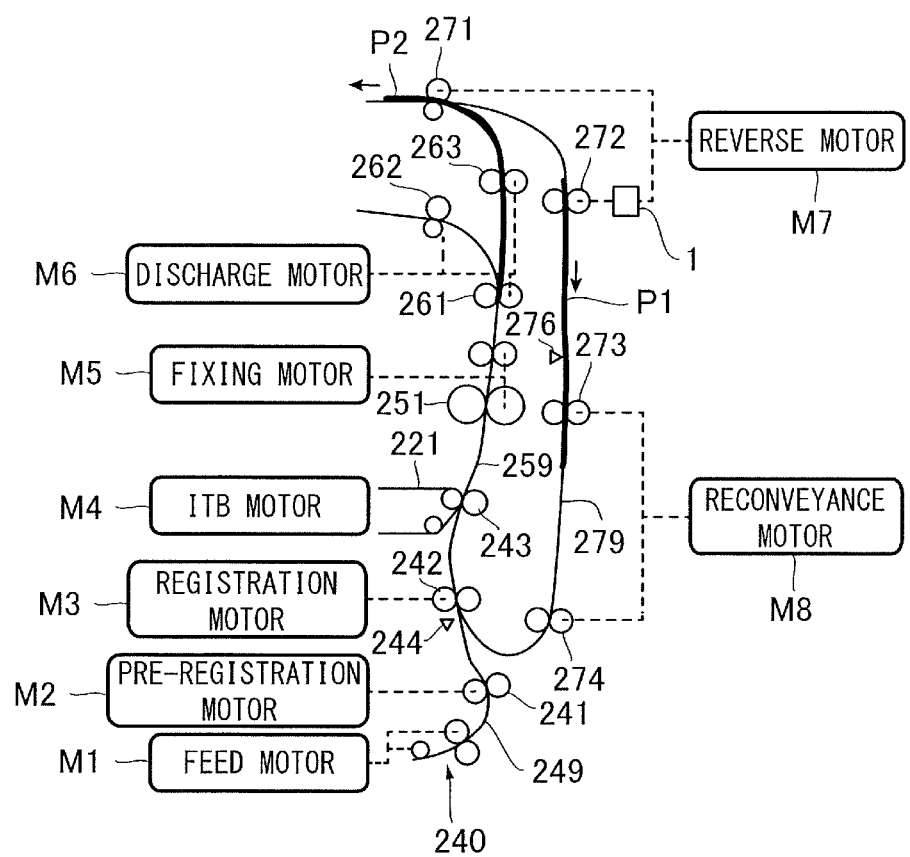
FIG. 7 is a schematic diagram illustrating a sheet conveyance system of the image forming apparatus including the one-way clutch according to the first or second embodiment.

As illustrated in FIG. 7, the image forming apparatus 200 includes, as a sheet conveyance system for feeding and conveying the sheet P, a sheet conveyance path 249, an image forming path 259 and the reconveyance path 279. A conveyance space of the sheet in these paths is formed by guide members supported by the apparatus body 201.

The sheet conveyance path 249 is a conveyance path for feeding the sheet P, and on the path 249 are arranged the sheet feed unit 240 and a pre-registration roller pair 241. The sheet feed unit 240 is driven by a sheet feed motor M1 and the pre-registration roller pair 241 is driven by a pre-registration motor M2.

The image forming path 259 is a conveyance path for conveying the sheet P and forming an image, and on the image forming path 259 are arranged the registration roller pair 242, the secondary transfer roller 243, the secondary transfer inner roller 222 and the fixing roller pair 251. The registration roller pair 242 is driven by a registration motor M3, the secondary transfer inner roller 222 is driven by an ITB (Intermediate Transfer Belt) motor M4, and the fixing roller pair 251 is driven by a fixing motor M5.

The reconveyance path 279 is a conveyance path that conveys the sheet P sent through the image forming path 259 toward the image forming path 259 again to perform duplex printing, and on the reconveyance path 279 are arranged a first reconveyance roller pair 272, a second reconveyance roller pair 273 and a third reconveyance roller pair 274. The reverse conveyance roller pair 271 receives the sheet P from the image forming path 259, reverses the sheet, and sends the sheet to the reconveyance path 279. The reverse conveyance roller pair 271 is also capable of discharging the sheet P onto a sheet discharge tray 280 arranged above the sheet discharge tray 280 on which sheets are discharged by the sheet discharge roller pair 262. The first to third reconveyance roller pairs 272 to 274 are arranged in the named order in the reconveyance path 279 along a direction from the reverse conveyance roller pair 271 toward the registration roller pair 242 (hereafter referred to as "sheet conveyance direction" unless stated otherwise).

The reverse conveyance roller pair 271 and the first reconveyance roller pair 272 are driven by a reverse motor M7, and the second reconveyance roller pair 273 and the third reconveyance roller pair 274 are driven by a reconveyance motor M8. A reconveyance sensor 276 serving as a detection unit capable of detecting a sheet is arranged between the first reconveyance roller pair 272 and the second reconveyance roller pair 273 in the sheet conveyance direction. Further, a registration sensor 244 serving as another detection unit is arranged at a vicinity on an upstream side of the registration roller pair 242. A photoelectric sensor capable of detecting that light has been blocked by a sheet, for example, can be used as these sensors.

The one-way clutch 1 according to the first and second embodiments can be suitably adopted as a part of a drive transmission apparatus that transmits driving force from the reverse motor M7 to the first reconveyance roller pair 272.

In a state where the reverse motor M7 rotates in a normal direction, the reverse conveyance roller pair 271 conveys the sheet toward the sheet discharge tray. In this state, the driving force from the reverse motor M7 is not transmitted to the first reconveyance roller pair 272, due to the function of the one-way clutch 1. In a state where the reverse motor M7 rotates in a reverse direction, the reverse conveyance roller pair 271 conveys the sheet toward the first reconveyance roller pair 272. In this state, the driving force from the reverse motor M7 is transmitted through the one-way clutch 1 to the first reconveyance roller pair 272, and the first reconveyance roller pair 272 conveys the sheet to a downward direction in the drawing.

In order to realize such operation, the one-way clutch 1 should be arranged so that the clutch 1 is in a released state when the reverse motor M7 rotates in the normal direction and the clutch 1 is in a connected state when the reverse motor M7 rotates in the reverse direction. For example, in a state where the outer member 10 serving as an example of a first rotator is connected to the reverse motor M7, the inner member 20 serving as an example of a second rotator is connected to the first reconveyance roller pair 272 serving as an example of the conveyance member, and in a state where the reverse motor M7 rotates in the normal direction, the outer member 10 should be arranged to rotate in the second direction R2 with respect to the inner member 20. However, as described above, it is also possible to connect the inner member 20 to the reverse motor M7 serving as a driving source and to connect the outer member 10 to the first reconveyance roller pair 272 serving as an object to be driven.

Now, the following operation becomes possible by arranging the one-way clutch 1 between the reverse motor M7 and the first reconveyance roller pair 272. In a state where a leading edge of the preceding sheet P1 conveyed to the first reconveyance roller pair 272 is transferred to the second reconveyance roller pair 273 by reverse rotation of the reverse motor M7 and where a trailing edge of the preceding sheet P1 has passed through the nip portion of the reverse conveyance roller pair 271, the reverse motor M7 is rotated in the normal direction. Then, in a state where the second reconveyance roller pair 273 is driven by the reconveyance motor M8 and the preceding sheet P1 is conveyed, conveyance of a succeeding sheet P2 by the reverse conveyance roller pair 271 is started. In this state, the one-way clutch 1 is in the released state, and the preceding sheet P1 is conveyed by the second reconveyance roller pair 273 so as to be drawn out of the first reconveyance roller pair 272.

That is, by rotating the reverse motor M7 in the normal direction while the preceding sheet P1 is still nipped by the first reconveyance roller pair 272, the one-way clutch 1 slips and prevents the preceding sheet from being pulled by the first reconveyance roller pair 272 and the second reconveyance roller pair 273. Therefore, compared to a case where the one-way clutch 1 is not arranged, there is no need to continue normal rotation of the reverse motor M7 until the preceding sheet P1 passes the nip portion of the first reconveyance roller pair 272, and the timing in which the succeeding sheet P2 is started to be conveyed by the reverse conveyance roller pair 271 can be set earlier. Therefore, during duplex printing, both in a state where the reverse conveyance roller pair 271 reverses the succeeding sheet P2 and in a state where the reverse conveyance roller pair 271 discharges the succeeding sheet P2 as it is onto the sheet discharge tray, the productivity of the image forming apparatus 200 can be improved.

The above-described configuration illustrates one application example of the one-way clutch 1 to the image forming apparatus, and the one-way clutch 1 can be applied to other areas in the image forming apparatus. For example, the one-way clutch 1 can be arranged between a sheet feed motor M1 serving as another example of the driving source and each of the pickup roller 40a and the sheet feed roller 40b of the sheet feed unit 240 serving as another example of the conveyance member (refer to FIGS. 6 and 7). In this way, even if the driving of the sheet feed motor M1 is stopped after the sheet reaches a roller pair, such as the pre-registration roller pair 241, arranged downstream of the sheet feed roller 40b, the one-way clutch 1 can slip to continue conveyance of the sheet.

There are cases where the image forming apparatus is equipped with a sheet processing apparatus for performing binding process and other processes to the sheet on which image has been formed or an image reading apparatus for reading document images while conveying the sheet serving as document, which are attached to the apparatus body including the image forming unit. The one-way clutch according to the present embodiment can be arranged on a drive transmission path for transmitting driving force from a driving source to an object to be driven such as a roller for conveying sheets in such auxiliary apparatuses. These auxiliary apparatuses are examples of a sheet conveyance apparatus for conveying sheets similar to the image forming apparatus described above.

Further, the one-way clutch according to the present disclosure is applicable to an arbitrary machine including an apparatus other than the image forming apparatus that connects two rotary members while permitting relative rotation in a predetermined direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-088926, filed on May 2, 2018, which is hereby incorporated by reference herein in its entirety.

What is claimed is:
1. A one-way clutch comprising:
a first rotator comprising an inner gear and configured to rotate on a first axis;
a planetary gear configured to mesh with the inner gear and configured to rotate on a second axis that revolves around the first axis;

a second rotator configured to rotate on the first axis and comprising a stopper configured to stop rotation of the planetary gear by engaging with the planetary gear, wherein relative rotation of the first rotator and the second rotator is restricted in a state where the planetary gear and the stopper are engaged, and is permitted in a state where the planetary gear and the stopper are disengaged; and an urging member configured to urge the planetary gear not to be brought in contact with the stopper in a state where the first rotator and the second rotator relatively rotate.

2. The one-way clutch according to claim 1, wherein the urging member is arranged such that urging force that the urging member applies to the planetary gear contains a component in a centripetal direction with respect to the first axis.

3. The one-way clutch according to claim 2, wherein the planetary gear comprises a shaft that extends along the second axis, wherein the second rotator comprises an opening portion that extends in a circumferential direction around the first axis and retaining the shaft rotatably, and wherein the shaft is urged by the urging member to be in contact with a wall surface, on an inner side in a radial direction with respect to the first axis, of the opening portion.

4. The one-way clutch according to claim 1, wherein the planetary gear comprises a shaft that extends along the second axis, wherein the second rotator comprises an opening portion that retains the shaft of the planetary gear rotatably, the opening portion comprising
   a first portion that extends in a circumferential direction around the first axis from a position of the shaft where the planetary gear engages with the stopper, and
   a second portion that communicates with the first portion and extends so as to be further close to the first axis as the second portion extends further away from the stopper in the circumferential direction, and wherein the urging member is configured to restrict the shaft from moving from the second portion to the first portion in a state where the first rotator and the second rotator rotate relatively.

5. The one-way clutch according to claim 1, wherein urging force that the urging member applies to the planetary gear contains a component in a centrifugal direction with respect to the first axis.

6. The one-way clutch according to claim 1, wherein urging force that the urging member applies to the planetary gear contains a component in a tangential direction perpendicular to a straight line passing through the first axis and the second axis when viewed in a direction along the first axis, the tangential direction being directed away from the stopper.

7. The one-way clutch according to claim 5, wherein in a state where the first axis and the second axis are aligned horizontally, a component toward an upper direction in a vertical direction of urging force that the urging member applies to the planetary gear is greater than a gravity acting on the planetary gear.

8. The one-way clutch according to claim 1, wherein the urging member is a spring of which a first end portion is engaged with the second rotator and of which a second end portion is engaged with the planetary gear.

9. The one-way clutch according to claim 8, wherein the second rotator comprises a supporting shaft that extends in an axial direction along the first axis, and wherein the spring is a torsion coil spring supported on the supporting shaft and fit to a recessed portion provided on an inner portion of the planetary gear.

10. The one-way clutch according to claim 1, wherein the planetary gear is one of a first planetary gear and a second planetary gear that are arranged at different positions in a circumferential direction around the first axis and each meshed with the inner gear, wherein the stopper is one of a first stopper that is configured to engage with the first planetary gear and a second stopper that is configured to engage with the second planetary gear, and wherein the urging member is one of a first urging member that is configured to urge the first planetary gear and a second urging member that is configured to urge the second planetary gear.

11. The one-way clutch according to claim 10, wherein positions of the first planetary gear, the second planetary gear, the first stopper, the second stopper, the first urging member and the second urging member in an axial direction are overlapped with each other, and wherein the first urging member and the second urging member are each arranged between the first stopper and the second stopper in the circumferential direction.

12. A sheet conveyance apparatus comprising:
a driving source;
a conveyance member configured to be driven by the driving source and convey a sheet; and
a one-way clutch configured to transmit driving force from the driving source to the conveyance member, the one-way clutch comprising:
a first rotator comprising an inner gear and configured to rotate on a first axis;
a planetary gear configured to mesh with the inner gear and configured to rotate on a second axis that revolves around the first axis;
a second rotator configured to rotate on the first axis and comprising a stopper configured to stop rotation of the planetary gear by engaging with the planetary gear, wherein one of the first and second rotators is coupled to the driving source and the other of the first and second rotators is coupled to the conveyance member, and wherein relative rotation of the first rotator and the second rotator is restricted in a state where the planetary gear and the stopper are engaged, and is permitted in a state where the planetary gear and the stopper are disengaged; and
an urging member configured to urge the planetary gear not to be brought in contact with the stopper in a state where the first rotator and the second rotator relatively rotate.

* * * * *